Feb. 2, 1971  R. J. EVANS ET AL  3,560,315
MONOLITHIC FLOORING
Filed Dec. 28, 1967
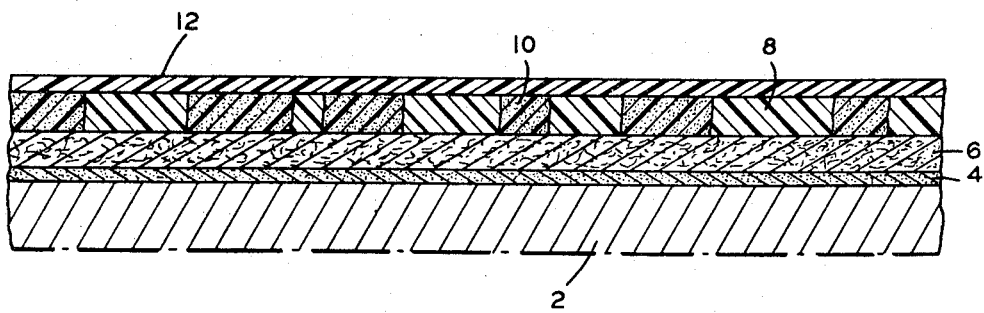
INVENTOR
RICHARD J. EVANS
JOSEPH M. JUDGE
BY Clifford B. Price
ATTORNEY

United States Patent Office 3,560,315
Patented Feb. 2, 1971

3,560,315
MONOLITHIC FLOORING
Richard J. Evans, Decatur, and Joseph M. Judge, Millersville, Pa., assignors to Armstrong Cork Company, Lancaster, Pa., a corporation of Pennsylvania
Filed Dec. 28, 1967, Ser. No. 694,295
Int. Cl. B32b *31/10;* E04c *1/24*
U.S. Cl. 161—37
2 Claims

ABSTRACT OF THE DISCLOSURE

A seamless flooring and a method for laying the seamless flooring. A backing material containing a plurality of chips fastened thereto is fastened to a subfloor. Grouting is placed over the backing in the area between the chips so that the grouting and upper surface of the chips form the upper surface layer of the flooring. A urethane wear-resistant layer is placed over top of the grouting and upper surface of the chips. The placing of the grouting over the backing on the job site eliminates the appearance of a seam in the composite floor structure.

BACKGROUND OF THE INVENTION

Field of the invention

The invention is directed to a seamless monolithic flooring. In particular the invention is directed to a flooring that is composed of component parts assembled on the job site to provide a seamless flooring.

Description of the prior art

The Almy et al. Pat. No. 3,170,808, issued Feb. 23, 1965, discloses the conventional flooring which utilizes a backing sheet with a chip or tessera structure adhered thereto and the area between the chips being filled with a fused matrix. This particular flooring is produced in large sheets and adhered to a subfloor by an adhesive layer. When laid, the abutting edges are carefully cut so they are positioned in a very close side-by-side relationship to provide only a hairline joint between the adjacent sheets. However, even this particular flooring when laid by skilled workmen still produces a flooring structure which has a seam readily visible to the average observer.

In an attempt to secure a seamless flooring, a poured-on flooring was developed. A typical flooring, sold under the trade name Torginol, is typical of this type of poured-on flooring. Torginol flooring is produced by pouring a urethane coating onto a flooring, then sprinkling a chip structure over top of the urethane coating, and finally placing a plurality of covering layers of urethane over top of the chips. This particular flooring does give a seamless appearance, but is limited in design. Currently the only designs available are of rather vivid colors, contain chip structures which give the floor a sparkling appearance, and fail in any way to appear like an inlaid stone flooring.

It is also conventional to provide a true stone tile flooring which is laid in the same manner as is used to lay the tile walls in the conventional bathroom. A conventional cement or adhesive is used to fasten stone particles to a subfloor and then a grouting or cement is used to fill in the areas around the stones.

At present the linoleum, vinyl plastic, or vinyl-asbestos flooring art is not capable of providing a true seamless flooring where the composite flooring must be assembled from two or more pieces. A poured-on flooring is a step away from the seamed flooring, but lacks a flexibility of design and an inability to simulate an inlaid stone flooring.

SUMMARY OF THE INVENTION

The invention involves the use of a beater saturated, asbestos-fiber felt upon which is adhesively secured tesserae which will be irregularly spaced apart and formed from a thermoplastic vinyl resin. The backing with tesserae is cut into easily handled sheets of approximately 24" x 24" and are fastened to a subfloor by conventional adhesives which are normally used to fasten sheet goods, linoleum or floor tiles in position. An epoxy resin grouting is then troweled into the spaces between the tesserae to fill in these spaces. After the epoxy resin has had an opportunity to set, the tesserae with the epoxy grouting is then covered with a urethane lacquer wear coat. The grouting overlies the backing material and particularly overlies the seams between two adjacent pieces of backing material. Consequently, the finished flooring gives the appearance to the average observer of being seamless in nature. The tesserae which are fastened to the backing may be of any number of different sizes, shapes, and general layout to provide an extreme flexibility of floor design. The particular backing sheets with the tesserae are composed of small, easily handled pieces which may be readily and rapidly laid in position.

BRIEF DESCRIPTION OF THE DRAWING

The figure is a cross-sectional view of the seamless flooring.

DESCRIPTION OF THE PREFERRED EMBODIMENT

Referring to the figure, there is shown a subfloor 2 on which has been laid a conventional adhesive 4 for the purpose of fastening the upper decorative flooring layer to the subfloor. The upper decorative flooring is composed of a backing 6 carrying thereon tesserae 8 with a grouting 10 placed in the spaces between the tesserae and the tesserae and grouting overlaid by a urethane wear layer 12.

The backing is a beater saturated, asbestos-fiber felt such as disclosed in the Feigley Patent No. 2,759,813, issued Aug. 21, 1956. Also materials such as burlap, vinyl sheets and films, and the like may be used for the backing. This backing may be about 75" wide, about .039" thick, and of indefinite length. The upper face of the backing layer is provided with an adhesive to secure the tesserae thereto. The adhesive and tesserae are of the type disclosed in Almy et al. Patent No. 3,170,808, issued Feb. 23, 1965. The tesserae are fastened to the backing sheet in the manner set forth in the above-mentioned patent. The tesserae may also be made from ceramic materials or thermoset materials.

The backing with the tesserae could be prepared in large rolls and moved to the construction site and laid in position as a large roll. Alternatively, the large rolls could be cut into easily handled pieces, approximately 24" x 24", and the individual pieces could be adhesively secured to the subfloor at the job site. Once the backing with the tesserae is fastened to the subfloor, the epoxy grouting is applied to fill in the spaces between the tesserae.

The following formula will provide a composition suitable for use in the formation of the epoxy resin, all parts being given in percentage by weight:

EXAMPLE I

| | Percent |
|---|---|
| Epoxy resin, Araldite 508, a blend of a polyglycol epoxy resin with the condensation product of a bisphenol A-epichlorohydrin epoxy resin | 17.25 |
| Epoxy resin, Araldine 6004, reaction product of epichlorohydrin and 2,2-bis-(4-hydroxyl phenyl) propane, 5700 centipoises | 31.89 |
| Flow control agent, 60% solids silicon resin in xylene, 20 centipoises | 1.29 |
| Airout, silicone reacted with a tallate | 0.43 |
| Viscosity control agent, alkylate 31, inert diluent, hydrocarbon | 4.31 |
| Limestone | 17.25 |
| White pigment color | 1.29 |
| Water | 0.43 |
| Curing agent, ajicure B–001, modified heterocyclic primary diamine | 25.86 |
| | 100.00 |

In the preparation of the epoxy resin, all of the components above except the curing agent are factory mixed and placed in a container. Appropriate thickeners may be added to prevent settling of the limestone. The curing agent is kept in a separate container; and when both the curing agent and the factory-mixed material arrive at the job site, the curing agent is added to the other materials and mixed therewith in the conventional manner to prepare the epoxy resin which is then troweled on the floor to form the grouting between the tesserae.

The white pigment color may be changed depending upon the color that one desires to impart to the grouting. Naturally, the grouting color will be varied to provide a color which complements the color of the tesserae. The epoxy resin is ambient temperature cured and, therefore, must be permitted to set up before the final wear layer is applied.

The final wear layer is a urethane lacquer which is spread over top of the upper surface of the tesserae and the epoxy resin. For example, with the composition of Example I used in the formulation of the epoxy resin, the following composition will provide a compatible urethane lacquer. In this example, all parts are given in percentage by weight:

EXAMPLE II

| | Percent |
|---|---|
| Urethane lacquer | 98.1 |
| Ultraviolet absorber, reaction product of an unsaturated diacid and an alcohol | 0.4 |
| Catalyst, dibutyltin dilaurate | 1.5 |
| | 100.0 |

The urethane lacquer is composed of a urethane solid which is in a xylene solution. The solution contains a 42% solid urethane which is held in solution by the xylene.

The composite floor now consists of a wear layer which is a single, unitary layer spread over top of the substrata forming the composite flooring. The wear layer is bonded to the substrata and does not contain any seams. The backing sheet does contain a plurality of seams, but the grouting overlies these seams and conceals them from the view of a normal observer.

The invention in its broader aspects is not limited to the specific methods, compositions, and constructions described, but departures may be made therefrom within the scope of the accompanying claims without departing from the principles of the invention and without sacrificing its chief advantages.

We claim:

1. A surface covering assembled from components which are readily handleable at the site of installation and which gives the appearance of a seamless single sheet comprising, a plurality of pieces of readily handleable backing material adapted to be adhesively secured to a subfloor in edge-to-edge abutting relationship to each other, multiple spaced apart design elements of substantially uniform thickness bonded to the top surface of each of said backing pieces, a nontransparent, fluid-applied resinous grout in solid form filling the area on each piece of backing material between adjacent design elements and covering the seams formed by the abutting edge portions of the pieces of backing material and a single, unitary transparent, liquid-applied wear layer in solid form overlying the design elements and the grouting, all constituting a flooring means in which the seams formed by the abutting edges of the pieces of backing material are obscured by the nontransparent grouting to provide a seamless decorative wear surface thereon.

2. A surface covering as set forth in claim 1 wherein the readily handleable backing material is in sections approximately 24″ x 24″.

References Cited

UNITED STATES PATENTS

| 712,168 | 10/1902 | Worth | 52—388 |
|---|---|---|---|
| 2,887,867 | 5/1959 | Burchenal et al. | 156—299X |
| 3,056,224 | 10/1962 | Almy et al. | 161—38X |
| 3,170,808 | 2/1965 | Almy et al. | 117—20 |
| 3,212,946 | 10/1965 | Weller et al. | 156—299X |
| 3,239,981 | 3/1966 | Fitzgerald | 52—315X |
| 3,287,203 | 11/1966 | Elmendorf | 161—190X |
| 3,378,531 | 4/1968 | Heins et al. | 117—161X |
| 3,421,277 | 1/1969 | Frischmuth | 161—38X |
| 3,464,178 | 9/1969 | Deichert et al. | 156—71X |
| 3,486,960 | 12/1969 | Fitzgerald et al. | 156—304X |

HAROLD ANSHER, Primary Examiner

U.S. Cl. X.R.

52—315, 387, 388, 390, 589; 156—71, 300, 304; 161—38, 145